United States Patent [19]
Kleinschmidt

[11] 4,404,468
[45] Sep. 13, 1983

[54] PYRODETECTOR

[75] Inventor: Peter Kleinschmidt, Munich, Fed. Rep. of Germany

[73] Assignee: Siemens Aktiengesellschaft, Berlin & Munich, Fed. Rep. of Germany

[21] Appl. No.: 287,140

[22] Filed: Jul. 27, 1981

Related U.S. Application Data

[63] Continuation-in-part of Ser. No. 168,336, Jul. 14, 1980, abandoned.

[30] Foreign Application Priority Data

Jul. 27, 1979 [DE] Fed. Rep. of Germany ....... 2930632
Jul. 25, 1980 [DE] Fed. Rep. of Germany ....... 3028252

[51] Int. Cl.³ .............................................. G01J 1/00
[52] U.S. Cl. .................................. 250/342; 250/347; 250/349
[58] Field of Search ............... 250/338, 339, 340, 342, 250/347, 349, 353

[56] References Cited

U.S. PATENT DOCUMENTS

| | | | |
|---|---|---|---|
| 2,855,492 | 10/1958 | English, Jr. ......................... | 250/338 |
| 3,839,640 | 10/1974 | Rossin ................................ | 250/342 |
| 3,877,308 | 4/1975 | Taylor ................................ | 250/338 |
| 4,225,786 | 9/1980 | Perlman ............................. | 250/342 |
| 4,275,303 | 6/1981 | Mudge ............................... | 250/342 |

FOREIGN PATENT DOCUMENTS 2137848  2/1973  Fed. Rep. of Germany .

*Primary Examiner*—Janice A. Howell
*Attorney, Agent, or Firm*—Hill, Van Santen, Steadman & Simpson

[57] ABSTRACT

A pyrodetector is disclosed which has a sharply limited directional range of detection sensitivity for the detection of a body entering into its directional range at a distance from the detector, the body having a temperature which is different from that of its environment. A concave mirror for focusing thermal radiation emanating from the body is provided and a pyroelectric sensor positioned at a focus of the mirror is also provided and formed as a flat body consisting of an electrically non-conductive material and with a pair of electrodes. A cover transmissive to the incident thermal radiation is provided for protecting the sensor element against damage and air drafts. At least one further sensor element similar to the first sensor element and with essentially the same heating time constant is also provided and arranged adjacent to the first sensor element but beyond the mirror focus. The electrode pairs of all the sensor elements are connected to an electrical evaluation circuit which forms a difference between an output signal of the first and further sensor elements. The pairs of electrodes are each terminated with an impedance such that a time constant K of a decay time of the sensor element $R_x \cdot C_x = K$ is valid for all pairs of electrodes where $C_x$ is a capacitance of the capacitor formed from a respective pair of electrodes, $R_x$ is the respective terminating impedance, and $K < 10$ seconds. In a preferred embodiment of the invention a honeycomb grating is provided directly adjacent the transmissive cover which protects the sensor elements.

25 Claims, 13 Drawing Figures

PYRODETECTOR

RELATED APPLICATION

This application is a continuation-in-part application Ser. No. 168,336 filed July 14, 1980, now abandoned.

BACKGROUND OF THE INVENTION

The invention relates to a pyrodetector with a sharply limited directional range of detection sensitivity for the detection of a body entering into its detection directional range at a greater distance from the detector, the body having a temperature which deviates from that of its environment. Such a pyrodetector of the Heimann Company, Wiesbaden, for room supervision, for example, has a temperature-sensitive element situated at the focal point of a concave mirror. A window consisting of a germanium pane is situated in front of this sensor element. The window has a plurality of vapor deposition layers with which visible radiation and near infrared is filtered out. By so doing, the sensor element is only exposed to such longer wave infrared radiation as is persistently radiated from a living body.

Bolometers such as are described, for example, in U.S. Pat. No. 2,855,492, incorporated herein by reference, are known for another objective, namely for the quantitative measurement of the intensity of thermal radiation. Here again arrangements are shown with thermosensors which are likewise arranged in a concave mirror whose inside, in particular, is evacuated. In addition to the actual electrical resistance responding to the thermal irradiation, the arrangement disclosed in this Letters Patent also contains a second compensating resistor protected from the thermal irradiation. The compensation is carried out electrically with the assistance of a Wheatstone bridge.

A radiation meter disclosed in German Pat. No. 2,137,848, incorporated herein by reference, is known for yet another purpose. This radiation meter is intended for the remote display of the surface temperature of a test object arranged at a distance. This meter functions with two barretters, i.e. ceramic PTC—resistors, which must have differing Curie Temperatures, and whose characteristic curves which do not coincide must nonetheless exhibit the same steepness, at least in the measuring range. One of these barretters or PTC resistors is arranged in a focal point of the provided mirror. The other barretter is arranged in such manner that, in an additionally provided bridge circuit, it effects a compensation of the barretter quantitatively measuring the temperature, i.e. effects a zero offset compensation.

SUMMARY OF THE INVENTION

An object of the present invention is to provide a pyrodetector constructed with the simplest possible technical means which indicates a qualitative change of the value of a thermal radiation incident on this detector from a distant location proceeding from a given directional range. This detector, in particular, must not respond to a sudden heating of its entrance window and is only meant to cover such thermal changes as occur with time constants smaller than 10 seconds. In particular, the technical expense required for the pyrodetector to be specified should be kept low—but without sacrificing detector reliability—, so that this detector is economically useful for many applications, for example also as a door opener sensor. A further object of the invention is to design the inventive pyrodetector with simple means in such manner that it is only sensitive for a frequency range with a radiation wave length greater than 5 $\mu$m and does not respond to visible light and near infrared.

This object is achieved for a pyrodetector according to the invention by providing in addition to the focus sensor element at least one further sensor element comprised of the same material as the first sensor element and having a substantially same heating time constant. The further sensor element also has a pair of electrodes and is arranged adjacent to the first sensor element but beyond the mirror focus of the predetermined directional range. The electrode pairs of all sensor elements are connected to an electrical evaluation circuit for forming a comparison between an output signal of the first and the further sensor element. The pairs of electrodes of the sensor elements are terminated with an impedance such that a time constant K of a decay time of the sensor element $R_x \cdot C_x = K$ is valid for all pairs of electrodes, where $C_x$ is a capacitance of the capacitor formed from a respective pair of electrodes, $R_x$ is the respective terminating impedance, and $K < 10$ seconds.

A fundamental principle of the invention pyrodetector is the employment of a first and at least one further sensor element. The first element is arranged in the focus and thus is charged by the infrared radiation directed from a distant area and incident in a focused manner. In contrast thereto, the one or all of the further elements are arranged beyond the focus of the mirror. There, these further elements are charged by radiation from the proximity of the mirror which is incident upon said mirror. In particular, it is therefore a matter of radiation proceeding from the covering of the mirror and/or of the sensor elements. The sensor element arranged in the focus is charged by this radiation in the same manner as are the further sensor elements.

A film consisting of polyvinylidenedifluoride (PVDF) or consisting of ferroelectric ceramic is preferably provided as the material with permanent, particularly impressible orientation polarization for the pyrodetector of the invention.

In an embodiment with a plurality of further sensor elements, it is to be recommended to arrange these in distributed manner in the region beyond the focus.

A particularly preferred embodiment of the invention is to provide the sensor elements of the first sensor and of the one or more further sensors as a single body, for example in the form of a single ceramic lamina or of a single PVDF film. The individual sensor elements are then individual areas of this single body. In particular, the electrodes of these individual areas can be a respective common electrode formed on the two surfaces of the lamina or, respectively, of the film. Depending on the electrode configuration, it then suffices to provide only a single, common terminating impedance for the individual sensor elements, although a differential formation forms the detector output signal, namely the difference of the output signal of the first sensor element on the one hand and of the one or of the plurality of further elements on the other hand. This is achieved by means of varying, impressed, permanent orientation polarization in this one body, lamina or film provided according to further developments. Details are described in relation to the explanations of the embodiment described hereafter.

Important embodiments of the invention relate to the selection of the material and/or of the embodiment of the covering provided according to the invention. It is favorable to employ a film consisting of polyethylene for this covering, namely such a covering, in particular, as consists of commercially available, opaquely colored polyethylene. This colored polyethylene is permeable to infrared radiation and exhibits no significant absorption of the infrared thermal radiation to be detected. This covering which is heated by infrared radiation proceeding from the near range of the pyrodetector and which is not meant to be detected, is arranged at an interval from the sensor. This interval is dimensioned in such manner that a thermal influence proceeding from this covering has an at least essentially uniform influence on the first element provided in the focus of the mirror and on the further sensor element or further elements provided outside of the focus.

According to a further development, it is advantageous to roughen the surface of the covering, i.e. the film forming it, for filtration, particularly of light radiation and/or short wave infrared radiation with wave lengths of, in particular, less than 5 μm which are incident from the distant range to be detected. Given a peak-to-valley height of, for example, 2 to 5 μm, radiation with wave lengths shorter than approximately 5 μm and, in particular light radiation, is greatly scattered as though the cover were the source of this radiation. When in the proximity of the covering of the mirror, this radiation, however, functions in the same manner (as described above concerning the thermal radiation of the covering) on the first and the further sensors and is not detected according to the invention.

The roughening specified for the covering can also be provided instead of and/or additionally on the surface of the existing mirror with a fundamentally same effect.

Upon employment of polyvinylidenedifluoride (PVDF) as the detector material, i.e. as the material with pyroelectric effect for the sensors, an effect discovered in conjunction with the invention can be advantageously exploited. This effect is that the PVDF material exhibits a great radiation absorption in the range from 7 to 20 μm, in contrast whereto the material is largely of completely transmissive for radiation of shorter wave lengths. If, given sensor elements consisting of PVDF film, one employs electrodes which are radiation-transmissive for radiation of shorter waves than at least approximately 5 μm, that is electrodes transmissive either on both sides or transmissive on the one side and reflecting on the other side, then it is achieved in these embodiments that the long wave radiation between 7 and 10 μm to be evaluated is absorbed on one side in the material of the film. In accordance with this embodiment, the shorter wave radiation (to which the pyrodetector is not meant to respond) can pass directly through the sensor or, after reflection at the reflecting electrode, can again depart the detector. A sputtered-on layer consisting of ZnO as well as a silver layer approximately 10–100 nm thick are suitable for such a transparent electrode.

In order to achieve the lowest possible time constant for the response of the inventive pyrodetector, the following measures are advantageous, namely to allow the infrared radiation in the mirror which is to be detected to be incident from both sides into the lamina or, respectively, the film or, given radiation incidence into the sensors from only one side, to design only the electrode for the thermal radiation to be detected which faces the radiation source so as to be transmissive and to make the counter-electrode for this radiation reflecting or, respectively, mirroring. Given incidence from one side, a bent mirror in particular can be arranged behind the transparent sensor range. Given arrangement of the further sensor elements beyond the focal plane of the mirror as well, the sensitivity of the detector is limited in accord with the imaging in the direction of the axis of the mirror.

In a further important aspect of the invention a honeycomb grating is provided directly adjacent and as a support for a thin synthetic film functioning as the covering over the mirror.

DESCRIPTION OF THE PREFERRED EMBODIMENTS

Figure 1:
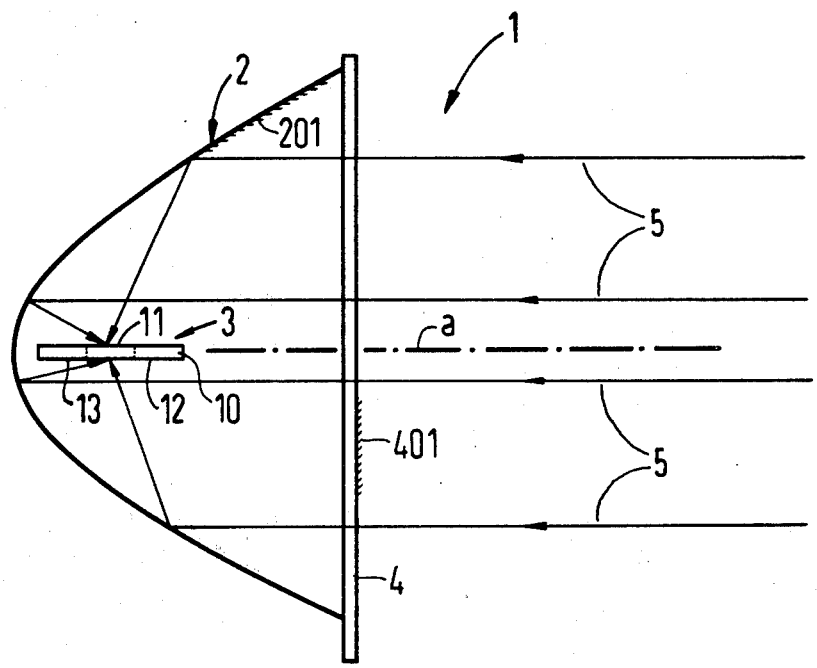
FIG. 1 shows a first embodiment of a pyrodetector according to the invention in an overall view.

FIG. 1 shows a fundamental illustration of a pyrodetector 1 of the invention with a parabolic reflector 2 and a sensor 3. The sensor 3 and, preferably, the entire inside of the mirror is covered by a covering 4 so as to protect against damage as well as against air draughts from the outside whose temperature or whose changing temperature could negatively influence the orderly detection of the pyrodetector 1. Numeral 5 indicates an infrared radiation proceeding from a distant location and incident into the mirror 2. "Distant" location is here to be understood as meaning that the distance of the location at which the body emitting the thermal radiation to be detected is located, as calculated from the mirror 2, is great in comparison to the dimensions of the mirror 2, so that the incident radiation can be considered as an essentially parallel radiation which is focused in the focal point of the mirror. Other thermal radiation incident especially from the immediate environs of the mirror 2—insofar as said radiation is not already absorbed by the filtering effect of the covering 4—is incident upon the inside of the mirror 2 from all directions and, in any case, experiences no concentration in the focal point.

The mirror 2 and/or the covering 4 can be roughened, as indicated at partial locations 201 and 401, and has already been explained above, in order to render it insensitive, particularly to light radiation. The radiation referenced 5 thus indicates the sharply limited directional range of the detection sensitivity of the inventive pyrodetector. As is known, radiation in this directional range is focused in the focal point of the parabolic mirror 2. An element 11 of the heat-sensitive sensor 3 is situated at the location of the focal point. Here, however, this only has the function of qualitatively identifying changes of the intensity of the incident radiation 5. In order, however, to distinguish between changes of intensity of the radiation 5 and changes of intensity of radiation incident upon the mirror 2 from other directions, particularly from close range and, above all, proceeding from the cover 4, one or more further sensor elements 12, 13 are provided.

Figure 2:
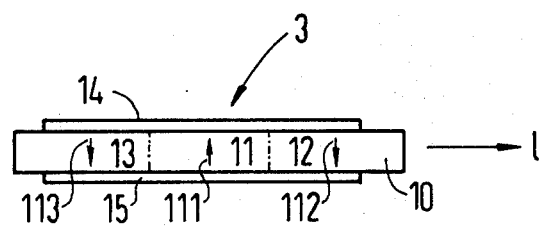
FIG. 2 shows a detailed illustration of an embodiment of a sensor provided in the detector according to FIG. 1.

For the sake of greater clarity, the sensor referenced 3 in FIG. 1 is reproduced in FIG. 2 in an enlarged scale. According to a preferred development of the invention, this sensor 3 consists of a preferably single lamina or disk 10 consisting, for example, of ferroelectric barium titanate, lead circonate-titanate, or consisting of PVDF film.

In the embodiment illustrated, the lamina 10 is subdivided, for example, into three portions for the elements 11, 12 and 13, of which the portion 11 exhibits a direction of the orientation polarization 111 which is opposite the direction of the orientation polarization 112 and 113 of the other portions 12 and 13. The portion 11 of the lamina 10 is the thermal-sensitive element of the first sensor. Accordingly, the portion 11 is arranged in the mirror 12 in such manner that it is at least essentially situated at its focal point. Portions 12 and 13 adjacent to portion 11 then correspondingly lie beyond the focus of the mirror 2. The longitudinal axis of the lamina 10 indicated by the arrow 1 is advantageously aligned in the direction of the optical axis a (see FIG. 1) given mirrors which are deep in relationship to their diameter. By so doing, an optimum insensitivity of the inventive pyrodetector to thermal radiation incident from beyond the directional range is achieved, because, by so doing, only radiation reflected at the mirror in particular, strikes the sensor 3. This preferred alignment illustrated in FIG. 1 has the additional advantage that radiation incident upon the mirror can reach onto or, respectively, into the sensor 3 from two sides, whereby a higher measuring sensitivity and a lower time constant are achieved.

TGS (Triglycinesulfate) single crystals, Lithiumtantalate (LiTaO$_3$) single crystals, the ceramic materials Pb$_{0.88}$, Bi$_{0.08}$(Zr$_{0.9}$Ti$_{0.1}$)O$_3$ and, above all, Pb[Ti$_{0.02}$Zr$_{0.88}$(Fe$_{1/2}$Ta$_{1/2}$)$_{0.1}$]O$_3$, as well as, above all PVF$_2$ (PVDF) already repeatedly mentioned are particularly suitable as the material for the sensors 3 or, respectively, for the sensor elements 11, 12 and 13. The physical data of interest for the realization are cited in the table.

The employment of disks or lamina with a thickness of 0.03 through 0.1 mm is to be recommended for the ceramic material cited. The employment of film with a thickness below 20 $\mu$m is advantageous for PVF$_2$. Small thickness of the lamina and of the films promotes a small time constant as a result of only slight thermal capacity and renders possible high thermal dissipating resistance to the environment in a simple manner.

Figure 3:
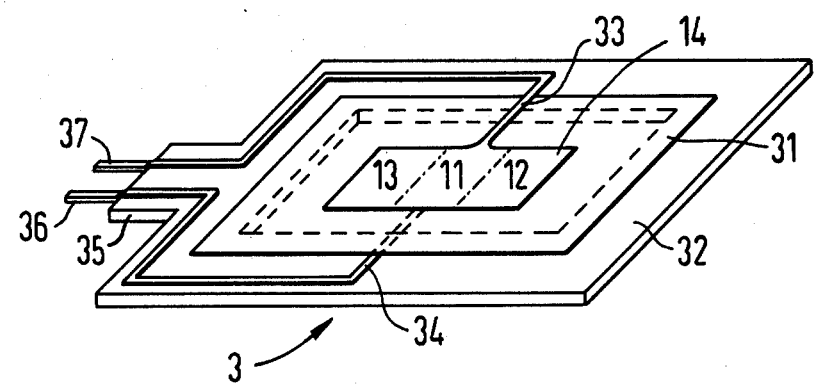
FIG. 3 shows a mechanical structure of a sensor whereby this structure is particularly suited for an embodiment with film.

By way of a sample embodiment, FIG. 3 shows a format of a sensor 3 with a PVDF film 31 which is secured by stretching to a frame 32. Since the film 31 is transparent, the contours illustrated with broken lines are visible through the film per se.

Advantageously, only a central area of the film 31 is employed for the elements 11, 12 and 13 already cited above, so that a significant interval exists from these elements up to the inside edge of the frame 32, in which interval the film forms a rather high thermal dissipating resistance. The electrodes (preferably transparent) situated on both surface sides of the film 31 and not illustrated in greater detail in FIG. 3 are electrically connected to the respective surface side of the film by thin, vapor-deposited tracks 33 and 34 (the latter on the backside of the transparent film). A projection referenced 35 with two plug pins 36 and 37 can be provided for the frame 32. The plug pins 36 and 37 can be provided not only for the electrical connection of the sensor 3 in the pyrodetector 1, but, rather, also for its mounting in the mirror 2.

Figure 4:
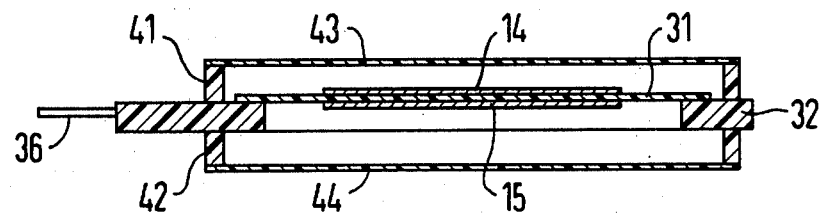
FIG. 4 shows a sideview of the sensor according to FIG. 3 with additional covering.

In a sideview, FIG. 4 shows a frame 32 according to FIG. 3 with a PVDF film 31 situated on one side of the frame 32. In the illustration of FIG. 4, the frame 32 has frame members 41 and 42 connected as a one piece construction with the frame or as separate pieces. Via frame members 41 and 42 films 43 and 44 consisting preferably of high pressure polyethylene are stretched. These films 43 and 44 serve to protect the film 31 of the sensor 3 from air draughts from the outside and against damage to the completed sensor. The films 43 and 44 function like the covering 4 already described and can be provided in addition to or instead of the covering 4. In order to avoid disruptive heating due to radiation proceeding from these films 43, 44, these films should absorb as little as possible or, given significant absorption of the film in the range $\lambda < 5$ $\mu$m, the structure, for example the material thickness, should be selected in such manner that a time constant results for the arrangement of these films which exceeds the 10 second time constant.

Figure 5:
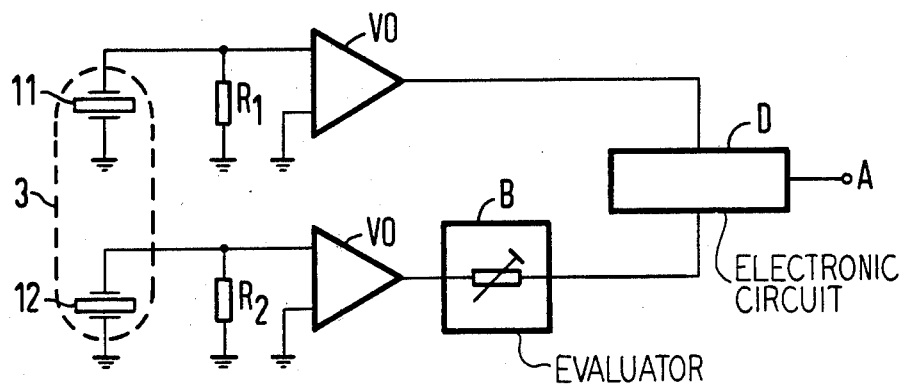
FIG. 5 shows a basic circuit diagram for explaining the features of the electronics of the pyrodetector.

In the following, details concerning the electric circuit of the inventive pyrodetector and particularly advantageous arrangements of the electrodes connected thereto are indicated. FIG. 5 illustrates a basic circuit diagram of the function of a pyrodetector of the invention. In FIG. 5, the sensor consists of the separately illustrated elements 11 and 12, whereby the element 12 here represents all of the sensor elements arranged beyond the focus. $R_1$, $R_2$ indicate the respective terminating impedances of the sensor elements. $V_o$ are amplifiers for the corresponding amplification of the pyroelectric signals of the elements 11 and 12. With the assistance of an evaluator or compensator B, the two output signals of the amplifiers $V_o$ can be matched to one another so that circuit D as a comparator, supplies an output signal to A from the difference of the two amplified signals which, in the idle operation case given when no object to be detected exists, has a minimum value or, respectively, the value zero.

According to a further development of the invention, as already mentioned above the signal difference formed according to the principle of FIG. 5 in an electronic circuit D can be formed by means of an advantageous division of the electrodes and of the polarization in the body 10 of the sensor 3. This feature eliminates errors which can occur when high signals of one or more elements 11 and 12 overdrive the pre-amplifiers and form an only apparent difference. Moreover, the dead time as a result of massive overdrive due to objects close to the sensor is thereby prevented.

Figure 6:
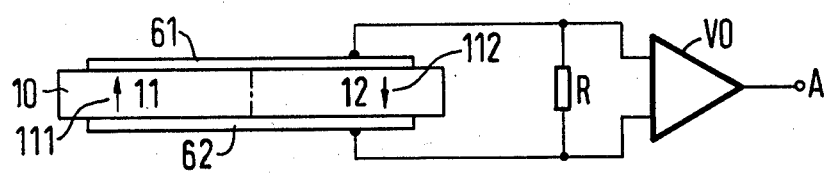
FIG. 6 shows a first electrical circuit diagram for a sensor of the pyrodetector.

Concerning this, FIG. 6 shows a basic circuit diagram in which continuous electrodes 61 and 62 with the capacitance $2 \cdot C_x$ with only one intervening terminating impedance $R = R_x/2$, are provided on the body 10 or, respectively, the film 31 for the elements 11 and 12. In the two portions of the body 10 forming the elements 11 and 12, the polarization—as illustrated with the arrows 111, 112—is oppositely directed. The dimensioning of the surface or, respectively, volume components of the sensor elements 11 and 12 of the body 10 (or, respectively, of the film 31) is undertaken in such manner (i.e. the dimensions and the amount of the polarization values are of identical size in the control case) so that, given lack of a distant object to be detected by the inventive pyrodetector, thermal-electrical polarization equilibrium exists in the body 10 and the output signal at the terminating impedance is equal to zero.

Figure 7:
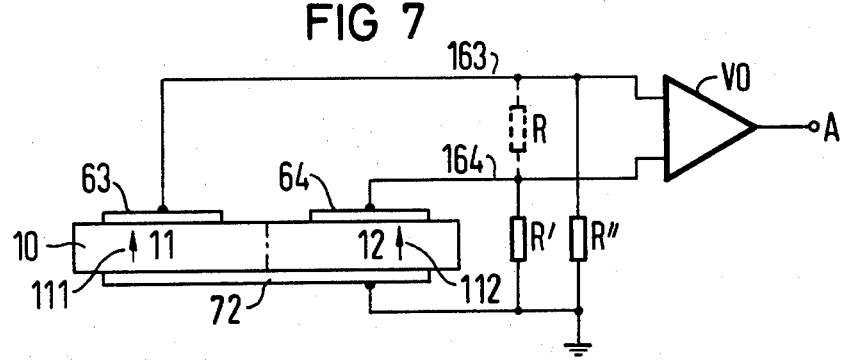
FIG. 7 shows a second electrical circuit diagram for a sensor of the pyrodetector of the invention.

FIG. 7 shows an embodiment with series connection in which the back electrodes 72 for the two portions of the body 10 forming the sensor elements 11 and 12 is continuous, and for which, however, separate electrodes 63 and 64 are provided on the upper surface for sensor elements 11 and 12. It would suffice to provide a single terminating impedance $R = 2R_x$ (indiated with broken lines) between the outputs 163 and 164 of the electrodes 63 and 64. However, it is more advantageous to guarantee electrical equilibrium to provide a respective terminating impedance R' and R" respectively equal to $R_x$ for the two outputs 163 and 164, which terminating impedances—as illustrated in FIG. 7—are connected at one terminal to one another and to the electrode 72. Preferably, this connection is grounded. VO again indicates an amplifier and A again indicates the output for the differential signal.

For dimensioning, the terminating impedance R for the example of FIG. 6, a resistance value which is only half as great in comparison to the example of FIG. 5, is provided, due to the parallel connection of the two sensor elements 11 and 12. The dimensions as in the example of FIG. 5 apply to the example of FIG. 7, i.e. resistance values $R' = R'' = R_x$ are to be provided for equal time constants of the two sensor elements 11 and 12 given equal capacitance between the electrodes of the individual elements 11 and 12.

Figure 8:
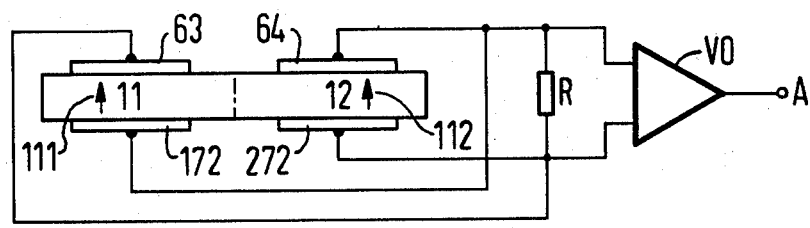
FIG. 8 shows a third electrical circuit diagram for a sensor of the pyrodetector of the invention.

FIG. 8 shows a variation of FIG. 6 with identically directed polarization in the two sensor elements 11 and 12 and—as can be seen from the Figure—oppositely connected electrode pairs 64, 272 and 63, 172. What was said concerning FIG. 6 applies for dimensioning the terminating impedances R of FIG. 8.

Figure 9:
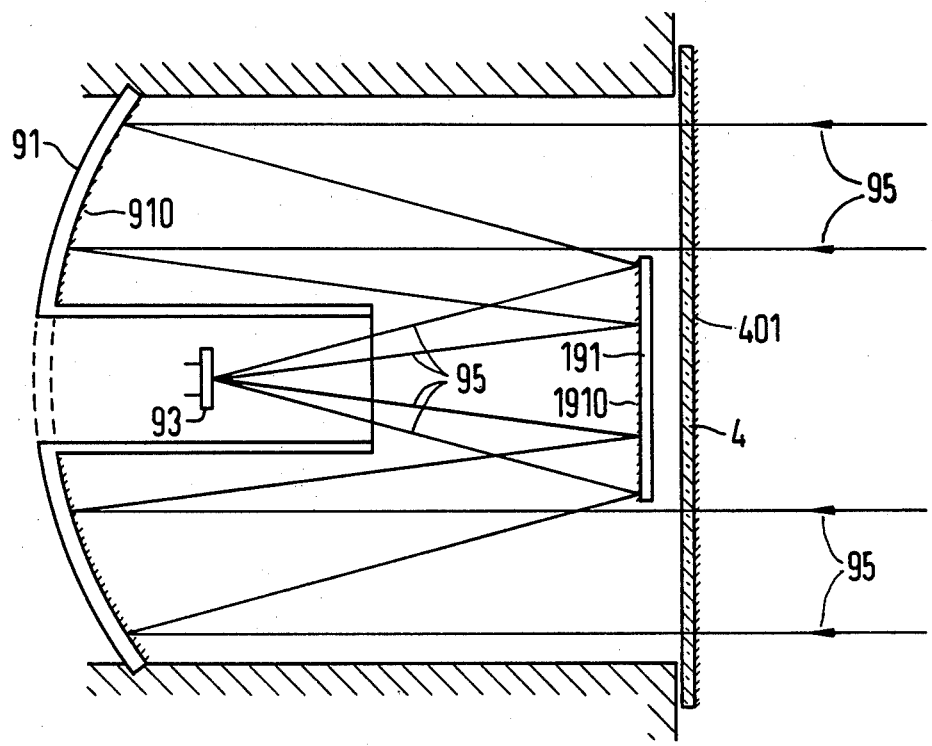
FIG. 9 shows an overall view of a second embodiment of a pyrodetector according to the invention.
Figure 10:
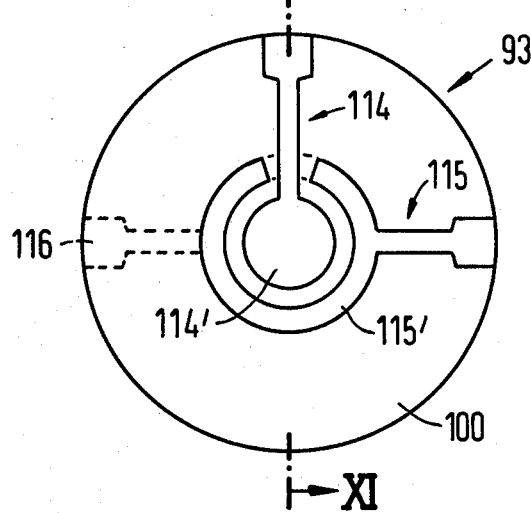
FIGS. 10 and 11 in plan view and in side view, show a sensor for an embodiment according to FIG. 9.
Figure 11:
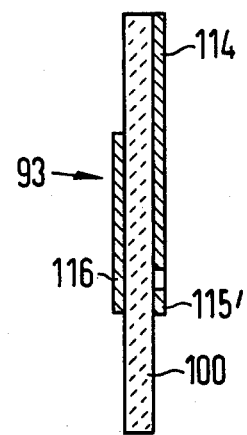

FIGS. 9, 10 and 11 relate to a further embodiment of an inventive pyrodetector. In this embodiment, a Cassegrain mirror 91 is provided as the focusing concave mirror in whose focal point the first sensor element is again situated. The radiation referenced 5 in FIG. 1 is refenced here with 95. The overall sensor is referenced 93, here again comprising the first sensor element and a further sensor element. The first sensor element of the sensor 93 is situated in the focal point of the mirror 91, 191. As in the mirror 2, the mirroring surfaces 910, 1910 can also be roughened here in order to avoid a focusing of shortwave infrared radiation and, in particular, visible radiation. Additionally or instead, a roughening 401 of the cover 4 can also be provided. In FIGS. 10, 11 the sensor 93 is illustrated enlarged both in plan view and in longitudinal section. The body, for example, a ceramic lamina or a PVDF film, comparatively referenced 10 in FIGS. 1 and 2, is indicated at 100. 114 and 115 are the electrodes of the front side (as seen with reference to the mirror 191 and the radiation incidence 95) shaped as illustrated. 116 indicates the electrode of the backside. The electrodes 114 and 115 thus can be designed both radiation-transmissive as well as absorbent. In the former case, it is recommended that the electrode 116 be designed reflective for this radiation, since the radiation, particularly the radiation 95 to be detected, then passes twice through the material of the body 100 and a correspondingly doubled sensitivity is achieved. The central portion 114' of the electrode 114, as can be seen from FIG. 10, indicates the surface area of the first sensor element. This surface area 114' is situated in the focus of the Cassegrain mirror 19, 191. The surface area of the annular portion 115' of the electrode 115 forms the further sensor. The size dimensions of the electrode portions 114' and 115' and their interval from one another are dimensioned in such manner that the portion 115' is no longer struck by radiation 95 incident upon the mirror from the distant location. The ratio of the surfaces of the portions 114' and 115' to one another is approximately 1:1, so that—as already explained with respect to FIGS. 5 through 8—a single or a plurality of terminating impedances can be employed depending upon parallel connection or series connection. To this end, a distribution of the polarization, i.e. a selection of the polarization direction, as described with respect to the preceding figures, is to be provided in the surface areas of the portions 114' and 115'.

Given a pyrodetector in accord with the invention, a disappearing differential signal, i.e. the signal value zero, is at the output as long as no body to be detected arrives in the detection range. This signal value is the difference of two signals different from zero, namely of the first sensor element and of the totality of the further sensor elements. Accordingly, signals of identical size, given uniform thickness of the flat body or, respectively, of the film, are based on equality of surface of the first sensor element on the one hand and of the totality of the further sensor elements 12, 13 on the other hand. Such an embodiment—if need be on the basis of experimentally dimensioned samples—can be realized in a simple manner, even in mass production. Upon employment of separate preamplifiers, as in the circuit diagram according to FIG. 5, an electronic balancing between the branch of the first sensor element and the branch of the further sensor element can also be provided.

Figure 12:
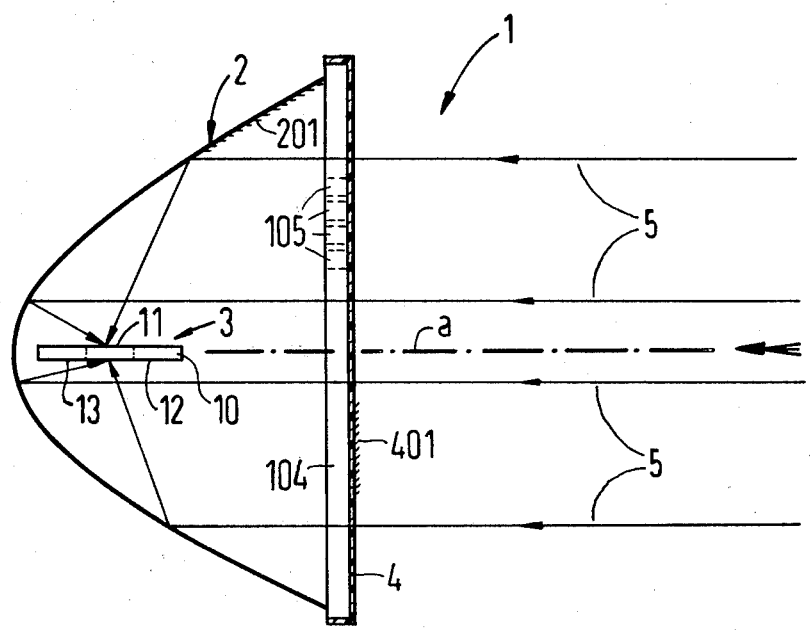
FIG. 12 is a side cross-sectional view of a further improvement of the invention.

A further improvement of the present invention is shown in FIG. 12. The improvement comprises the provision of a honeycomb grating 104 with a large opening-to-structure cross-section ratio of the holes 105 close to the covering 4 in front of the mirror 2. With respect to the remaining details of FIG. 12 and its reference characters, the description of FIG. 1 is applicable. Preferably, the entire covering as illustrated in FIG. 12 is designed in such manner that a thin film preferably comprised of polyethylene is provided as the covering 4 protecting the inside of the mirror 2 against air drafts. This covering is stretched over the body of the honeycomb grating 104. Thus, the honeycomb grating 104 serves as a mechanical supporting means for the film which is mechanically sensitive per se.

It is of particular advantage to provide the walls of the honeycomb grating 104, including the walls of its holes 105, with a metal layer and to connect it in an electrically conductive manner to the ground pole of the device. Thus, a good electrical screening or shielding of the inside of the concave mirror 2 is achieved without the electrical shielding metallization being able to effect any kind of damping of the intended radiation sensitivity of the inventive pyrodetector. It is also advantageous to blacken the walls of the holes 105 of the honeycomb grating 104 in such manner that reflections of laterally incident, undesired radiation are still absorbed in the honeycomb grating 4. This additional radiation absorption has no disadvantageous effect in the inventive pyrodetector for the very reason that this pyrodetector is highly insensitive to thermal radiation from the area of the covering 4, and thus from the area of the honeycomb grating 104 as well. Covering 4 and honeycomb grating 104 are located at practically the same place with respect to the mirror 2 and its interior regions.

Figure 13:
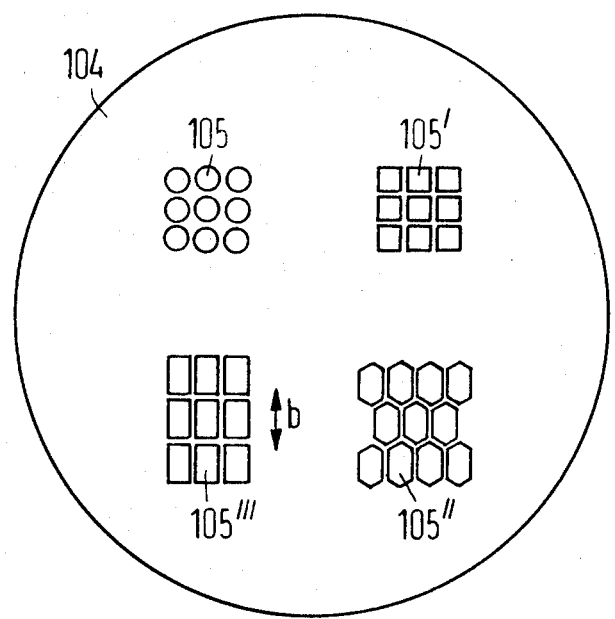
FIG. 13 is a plan view of the honeycomb grating 104 shown in FIG. 12.

FIG. 13 shows a plan view onto the body of the honeycomb grating 104, as viewed parallel to the detection direction, i.e., viewed from the direction of the feathered arrow in FIG. 12. The entire cross-section surface of the honeycomb grating 104—insofar as it covers the opening of the mirror 2—has holes referenced 105, 105', ... 105'''. The honeycomb grating 104 has a cross-sectional opening-to-structure ratio of at least 80% and the ratio of depth to maximum diameter of the holes 105 ranges from 1:1 through 5:1. To illustrate various embodiments, four groups of variously shaped holes 105 through 105''' are shown in FIG. 13 within the surface of the illustrated honeycomb grating 104. The holes can be round, rectangular, hexagonal and the like, as long as bridges situated between the holes 105 are sufficiently narrow in order to achieve the large cross-sectional opening ratio. In accordance with the ratio of depth to diameter, the holes or respectively the entire honeycomb grating 104, has a great absorbent effect on radiation which strikes the inventive pyrodetector obliquely, i.e., from a direction other than the detection direction.

On the basis of the present invention and the compensation effect for the thermal radiation deriving from the covering 4 and entering into the interior of the mirror, no disadvantageous effect results even when obliquely incident radiation with a very high intensity is absorbed in the honey-comb grating 104. Even given such a condition, a body entering into the detection direction can be detected clearly and in a fail-safe manner with a pyrodetector according to this invention. This is true even at a greater distance, or if the thermal radiation of the body is relatively weak in intensity. Besides this, yet another advantage can be achieved with an inventively provided honeycomb grating 104. This occurs when the surface of the honeycomb grating 104 or, respectively of the holes 105, 105', 105'', 105''', is metallized (or when the entire honeycomb grating 104 consists of metal) and this metallization is conductively connected to the device ground. Just like other known pyrodetectors with comparable sensor material, a pyrodetector according to the invention responds relatively easily to electrical charges situated in its proximity. Such charges, for example, can result from clothing, consisting of synthetic to a greater or lesser degree which is worn by persons situated in the proximity of the detector, who are not meant to be detected, and who are certainly not meant to be detected on the basis of their electrical fields.

It can be advantageous to make the honeycomb holes rectangular, oblong or rhomboidal, as is likewise illustrated in FIG. 3, and to construct the pyrodetector so that it is equipped with such a honeycomb grating 104 in such manner that the longitudinal direction b of the oblong holes is vertical, that is parallel to the position of a person standing or walking erect. By so doing, the pyrodetector of the invention additionally receives an asymmetrical directional characteristic with which it preferably responds to persons walking erectly.

A honeycomb grating 104 is preferably a synthetic injected or compacted body which is preferably metallized at its surface and colored.

For the sake of completeness, let it also be pointed out that the term "honeycomb grating" does not presume a specific cross-sectional shape—and thus not the shape of the holes of a honey bee honeycomb. Rather, this term is only intended to point out, above all, the relatively deep holes of the grating—in contrast, for example, to a wire sieve. The term "honeycomb grating" is standard for an entirely different purpose in a sense which is similarly broadly understood for high frequency shieldings.

Although various minor modifications may be suggested by those versed in the art, it should be understood that I wish to embody within the scope of the patent warranted hereon, all such embodiments as reasonably and properly come within the scope of my contribution to the art.

I claim as my invention:
1. A pyrodetector with a sharply limited directional range of detection sensitivity for the detection of a body entering into said directional range from a distance greater than the maximum sensing distance from the detector, said body having a temperature which deviates from that of its environment, comprising: a concave mirror means for focusing thermal radiation emanating from the body; a pyroelectric first sensor element positioned at the focus of the predetermined directional range of the mirror means and formed as a flat body comprising an electrically non-conductive material with permanent orientation polarization and which is provided with a pair of electrodes; cover means transmissive to the incident thermal radiation from the body and ambient thermal radiation and being positioned for protecting the first sensor element against damage and air drafts; at least one further sensor element comprised of the same material as the first sensor element and having substantially a same thickness so as to provide substantially identical heating time constants for the first and further elements; the further sensor element having a pair of electrodes and being located outside a focal plane of the minor means containing the focus and perpendicular to a focus axis but adjacent the first sensor element at a locus such that both the further sensor element and the first sensor element are subjected to an equal extent to the ambient thermal radiation emanating from said cover means;

the first and further sensor elements comprising central portions of a single flat body having opposite major surfaces, and a mounting means holding the single body at edges thereof;

the single flat body being aligned such that its major surfaces are parallel to and the body lies on the focus axis passing through the focus and extending in the direction of the detection range so that the first sensor and further sensor lie adjacent one another along said focus axis;

the concave mirror means having a parabolic shape and the focus lying within an inner half of the mirror;

the first and further sensor elements formed by the body absorbing only radiation reflected by the concave mirror means at the opposite major surfaces;

the electrode pairs of all sensor elements being connected to an electrical evaluation means; the pairs of electrodes each being terminated with an impedance such that a time constant K of a decay time of the sensor element $$R_X \cdot C_X = K$$

is valid for all pairs of electrodes, wherein $C_X$ is a capacitance of a capacitor formed from the respective pair of electrodes, $R_X$ is a respective terminating impedance, and $K < 10$ seconds; and an electronic evaluation means for forming a difference between an output signal of the first and of the further sensor elements.

2. A pyrodetector according to claim 1 wherein a plurality of further sensor elements are provided which are all arranged beyond the focus and adjacent to the first sensor element.

3. A pyrodetector according to claim 1 wherein the single body is a film.

4. A pyrodetector according to claim 1 wherein a respective continuous electrode is provided on both sides of the single body to provide said pairs of electrodes, a polarization direction in a portion of the body forming the first sensor element is directed opposite to a direction of polarization of a portion of the single body forming the further sensor element, and a common terminating impedance is provided as said terminating impedance for each sensor element.

5. A pyrodetector according to claim 1 wherein a continuous electrode is provided on the single body on one side, and on the other opposite side an electrode for the first sensor element and an electrode for the at least one further sensor element electrically separated from said electrode for the first sensor element is provided; a terminating impedance is connected between the two electrodes on the opposite side of the body; and polarization directions in areas of the first sensor element and of the further sensor element are aligned in a same direction with respect to one another.

6. A pyrodetector according to claim 5 wherein said terminating impedance connected between the two electrodes is divided into two series connected impedances and a central tap between these impedances is electrically connected to said continuous electrode of the one side.

7. A pyrodetector according to claim 1 wherein on both sides of the single body there is provided a respective electrode for the first sensor element and a respective element for the further sensor element respectively electrically separated from one another; the respective electrode of the one side of the first sensor element is connected to the electrode of the other side of the further sensor element to form a first terminal; the electrode of the one side of the further sensor element is electrically connected to the electrode of the other side of the first sensor element at a second terminal; a common terminating impedance being connected between the first and second terminals; and a polarization direction in an area of the first sensor element is directed opposite to a polarization direction in an area of the further sensor element.

8. A pyrodetector according to claim 1 wherein a single crystal comprising glycine-sulfate is employed for the flat body.

9. A pyrodetector according to claim 1 wherein a film comprising polyvinylidenedifluoride (PVDF) is employed for the flat body.

10. A pyrodetector according to claim 1 wherein ferro-electric ceramic is employed for the flat body.

11. A pyrodetector according to claim 1 wherein a Cassegrain mirror is provided as said concave mirror means.

12. A pyrodetector according to claim 1 wherein electrodes provided on both sides of the flat body are radiation-transmissive.

13. A pyrodetector according to claim 1 wherein radiation-transmissive electrodes are provided on one side of the flat body and electrodes are provided on the other opposite side of the flat body which mirror the radiation allowed to pass through the electrodes on the one side.

14. A pyrodetector according to claim 1 wherein the single body is enclosed on both sides by covering members attached at an interval from the single body.

15. A pyrodetector according to claim 14 wherein in the covering members are radiation-transmissive.

16. A pyrodetector according to claim 1 wherein a cover is provided on the mirror means having a roughening of a surface whose peak-to-valley depth leads to scattering of radiation whose wave length is shorter than approximately 5 $\mu$m.

17. A pyrodetector according to claim 1 wherein a mirroring surface of the mirror means exhibits a roughening region whose peak-to-valley depth leads to scattering of radiation whose wave length is shorter than approximately 5 $\mu$m.

18. A pyrodetector according to claim 1 wherein a honeycomb grating with a large cross-sectional opening-to-structure ratio of holes is positioned close to said cover means in front of the mirror means.

19. A pyrodetector according to claim 18 wherein a ratio of hole depth to maximum linear aperture width is in a range from 1:1 to 5:1.

20. A pyrodetector according to claim 18 wherein a thin film is employed as the cover means which is stretched over the honeycomb grating functioning as a support.

21. A pyrodetector according to claim 18 wherein walls of the holes of the honeycomb grating are metallized and are electrically connected to a ground for the pyrodetector.

22. A pyrodetector according to claim 18 wherein walls of the holes of the honeycomb grating are blackened.

23. A pyrodetector according to claim 18 wherein the honeycomb grating is comprised of metal.

24. A pyrodetector according to claim 18 wherein the honeycomb grating is comprised of a synthetic material and the grating is covered with a metallization layer.

25. A pyrodetector according to claim 18 wherein the holes are oblong in a given direction.

* * * * *